(12) United States Patent
Rovito et al.

(10) Patent No.: US 11,677,578 B2
(45) Date of Patent: *Jun. 13, 2023

(54) AUTOMATIC TRANSITIONS IN AUTOMATION SETTINGS

(71) Applicant: Level Home, Inc., Wilmington, DE (US)

(72) Inventors: Michael Andrew Rovito, San Francisco, CA (US); Greg William Reinbach, Fryeburg, ME (US); Isaac Gregory Martin, San Francisco, CA (US)

(73) Assignee: Level Home, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,164

(22) Filed: Oct. 14, 2020

(65) Prior Publication Data

US 2021/0051040 A1 Feb. 18, 2021

Related U.S. Application Data

(63) Continuation of application No. 15/690,975, filed on Aug. 30, 2017, now Pat. No. 10,848,334.

(Continued)

(51) Int. Cl.
*H04L 12/28* (2006.01)
*H04L 12/24* (2006.01)
(Continued)

(52) U.S. Cl.
CPC .......... *H04L 12/2807* (2013.01); *G05B 15/02* (2013.01); *H04L 12/2825* (2013.01);
(Continued)

(58) Field of Classification Search
CPC ............... H04L 12/2807; H04L 67/125; H04L 12/2825; H04L 12/2829; H04L 41/0816;
(Continued)

(56) References Cited

U.S. PATENT DOCUMENTS 5,933,085 A 8/1999 Holcomb et al.
9,426,432 B2 8/2016 Scalisi
(Continued)

*Primary Examiner* — Charles R Kasenge
(74) *Attorney, Agent, or Firm* — Perilla Knox & Hildebrandt LLP; Jason M. Perilla

(57) ABSTRACT

Various aspects and embodiments of automation in tenancy transitions are described. Among other aspects or features of the embodiments, a computing device in an automation or gateway hub receives and stores automation settings from an automation management service environment over time. The automation settings can include different settings for various states of occupancy of a rental unit or dwelling. For example, the automation settings can include a first set of automation settings, which can be used while the dwelling is occupied, and a second set automation settings for use after the dwelling is no longer occupied. The automation or gateway hub can determine whether a transition has occurred for the dwelling and, in response to the transition, load the different automation settings into one or more home automation devices of the dwelling.

20 Claims, 5 Drawing Sheets

Related U.S. Application Data

(60) Provisional application No. 62/381,151, filed on Aug. 30, 2016.

(51) Int. Cl.
*H04L 29/08* (2006.01)
*G05B 15/02* (2006.01)
*H04L 41/0816* (2022.01)
*H04L 67/104* (2022.01)
*H04L 67/125* (2022.01)
*G07C 9/00* (2020.01)
*H04W 84/18* (2009.01)

(52) U.S. Cl.
CPC ...... *H04L 12/2829* (2013.01); *H04L 41/0816* (2013.01); *H04L 67/104* (2013.01); *H04L 67/125* (2013.01); *G05B 2219/2642* (2013.01); *G07C 9/00817* (2013.01); *G07C 2209/02* (2013.01); *G07C 2209/08* (2013.01); *H04W 84/18* (2013.01)

(58) Field of Classification Search
CPC .......... H04L 67/104; G05B 15/02; G05B 2219/2642; G07C 2209/02; G07C 2209/08; G07C 9/00817; H04W 84/18
See application file for complete search history.

(56) References Cited

U.S. PATENT DOCUMENTS

| | | | |
|---|---|---|---|
| 9,709,292 B2 | 7/2017 | Steinberg | |
| 9,710,987 B2 | 7/2017 | Scoggins et al. | |
| 9,800,737 B2 | 10/2017 | Gaspard et al. | |
| 10,001,791 B2 | 6/2018 | Lagerstedt et al. | |
| 10,145,597 B2 | 12/2018 | Hur et al. | |
| 10,289,131 B2 | 5/2019 | Steinberg | |
| 10,490,003 B2* | 11/2019 | Eyring | G06Q 10/02 |
| 10,606,290 B2* | 3/2020 | Lagerstedt | H04W 4/029 |
| 11,100,465 B1* | 8/2021 | Burge | G05F 1/66 |
| 11,145,016 B1* | 10/2021 | Brophy | G06Q 30/0645 |
| 11,195,363 B1* | 12/2021 | Eyring | G06Q 10/02 |
| 2003/0149576 A1 | 8/2003 | Sunyich | |
| 2007/0176739 A1* | 8/2007 | Raheman | G07C 9/00904 340/5.64 |
| 2008/0215441 A1 | 9/2008 | Brueggemeier et al. | |
| 2010/0259382 A1 | 10/2010 | Brueggemeier et al. | |
| 2011/0132991 A1 | 6/2011 | Moody et al. | |
| 2011/0181412 A1 | 7/2011 | Alexander et al. | |
| 2011/0290893 A1 | 12/2011 | Steinberg | |
| 2012/0022902 A1 | 1/2012 | Gressel et al. | |
| 2012/0067560 A1 | 3/2012 | Bergman et al. | |
| 2012/0067561 A1 | 3/2012 | Bergman et al. | |
| 2012/0221151 A1 | 8/2012 | Steinberg | |
| 2012/0299700 A1 | 11/2012 | Davis et al. | |
| 2013/0268124 A1 | 10/2013 | Matsuoka et al. | |
| 2013/0331995 A1 | 12/2013 | Rosen | |
| 2014/0012424 A1 | 1/2014 | Kasper | |
| 2014/0039690 A1 | 2/2014 | Steinberg | |
| 2014/0120905 A1 | 5/2014 | Kim | |
| 2014/0306833 A1 | 10/2014 | Ricci | |
| 2015/0127176 A1 | 5/2015 | Bergman et al. | |
| 2015/0142140 A1 | 5/2015 | Yamaguchi et al. | |
| 2015/0168001 A1 | 6/2015 | Steinberg | |
| 2015/0199863 A1 | 7/2015 | Scoggins et al. | |
| 2015/0348049 A1* | 12/2015 | Todasco | G06Q 10/02 705/5 |
| 2015/0363989 A1 | 12/2015 | Scalisi | |
| 2016/0040902 A1 | 2/2016 | Shah | |
| 2016/0077532 A1* | 3/2016 | Lagerstedt | H04W 4/02 700/277 |
| 2016/0084551 A1* | 3/2016 | Hur | F24F 11/62 62/160 |
| 2016/0138822 A1 | 5/2016 | Steinberg | |
| 2016/0239001 A1 | 8/2016 | Chin et al. | |
| 2016/0258209 A1 | 9/2016 | Berman et al. | |
| 2016/0370775 A1 | 12/2016 | Daugherty et al. | |
| 2017/0115018 A1 | 4/2017 | Mintz | |
| 2017/0116561 A1 | 4/2017 | Saddler et al. | |
| 2017/0124842 A1 | 5/2017 | Sinha et al. | |
| 2017/0142483 A1 | 5/2017 | Warrick et al. | |
| 2017/0193720 A1* | 7/2017 | Eyring | G07C 9/00817 |
| 2017/0214801 A1 | 7/2017 | Gaspard et al. | |
| 2017/0336090 A1 | 11/2017 | Steinberg | |
| 2018/0259986 A1* | 9/2018 | Lagerstedt | G05D 23/1932 |
| 2018/0321699 A1 | 11/2018 | Bergman et al. | |
| 2019/0068792 A1 | 2/2019 | Gaspard et al. | |
| 2021/0350324 A1* | 11/2021 | Burge | G05D 23/1917 |

* cited by examiner

AUTOMATIC TRANSITIONS IN AUTOMATION SETTINGS

CROSS-REFERENCE TO RELATED APPLICATIONS

This application is a continuation of U.S. Non-Provisional patent application Ser. No. 15/690,975, filed Aug. 30, 2017, which claims the benefit of U.S. Provisional Application No. 62/381,151, filed Aug. 30, 2016, the entire contents of both applications are hereby incorporated by reference.

BACKGROUND

Some vendors offer property management software to assist rental property administrators with the management of interactions between property managers and new, current, and former residents. These tools can make it easier to manage properties, invoice for services and administer payments, onboard new residents, execute leases, etc. Some resident management software platforms provide resident screening, accounting, and reporting tools to help property managers and other stakeholders to know how different properties, groups of properties, and rental units at various locations are doing financially.

In a separate field, home or building automation includes the control and automation of lighting, door lock, appliance, security system, heating, ventilation, air conditioning (HVAC), window covering, and other automation devices, as well as air temperature, air quality, water, and other sensor devices. In that context, automation systems can include a number of automated, locks, switches, sensors, and other devices connected to a central automation hub or gateway through which the system is controlled. Various types of user interfaces can be used with such home or building automation systems, such as wall mounted terminals, mobile phone applications, internet or web interfaces, among others.

Today, there are several competing vendors in the field of home automation. Thus, central automation hubs may be designed to operate with various types of third party vendor home automation equipment and devices. To achieve interoperability with the greatest number of third party devices, central automation hubs can be designed to communicate with those devices using one or more communications standards and/or protocols, including X10®, Zig-Bee®, Z-Wave®, and others.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
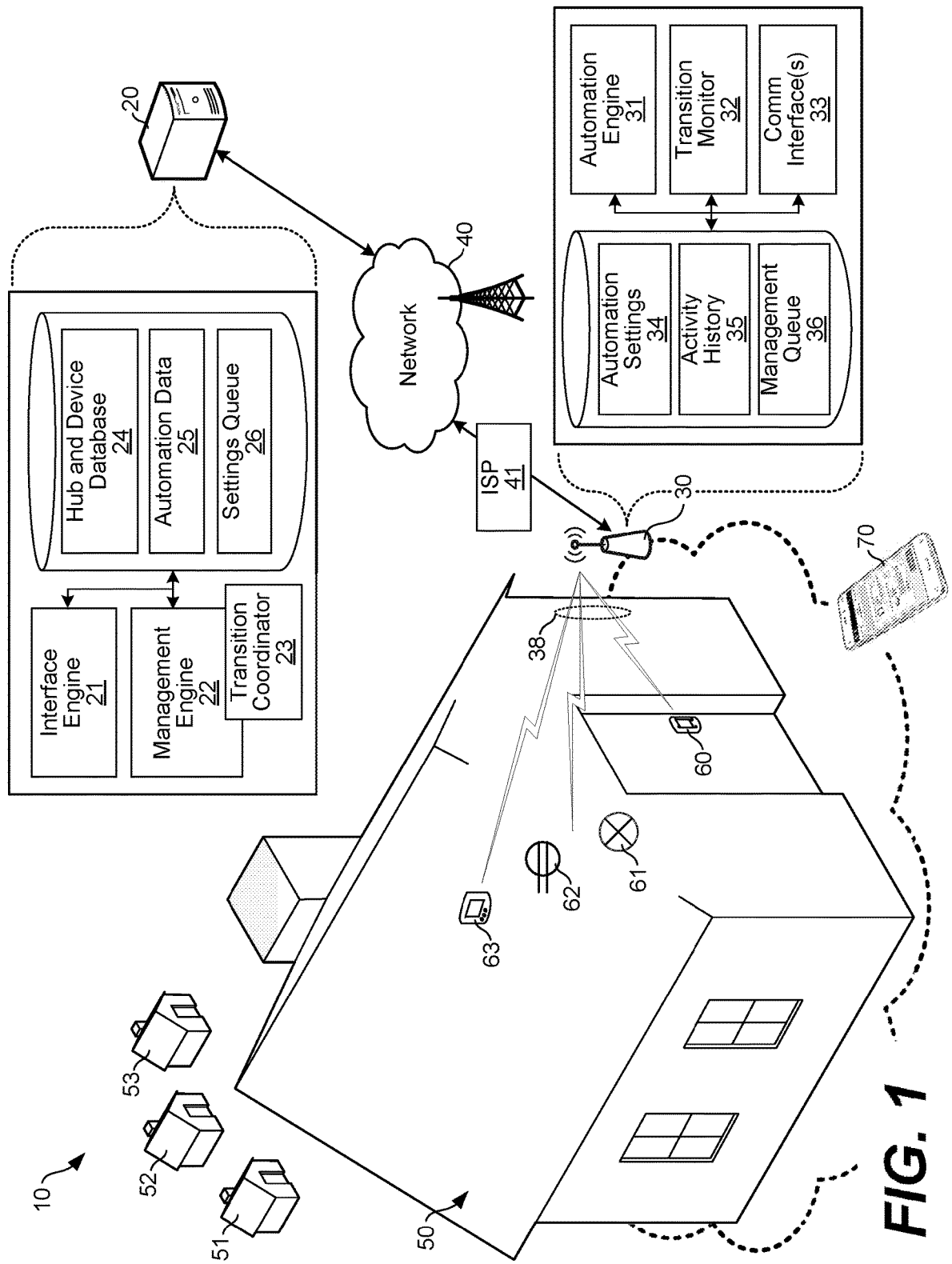
FIG. 1 illustrates an example networked environment for automatic transitions in automation settings according to various examples described herein.

As noted above, some property management software platforms assist rental property administrators in the management of interactions between property managers and new, current, and former residents. Certain resident management software platforms provide resident screening, accounting, and reporting tools to help property managers and other stakeholders.

However, resident management software platforms do not assist with or automate all the tasks necessary to transition a rental unit or dwelling from a former to a new resident. For example, when a former resident moves out of a rental unit, it might be necessary (or at least advisable) that the unit be inspected by maintenance personnel, be cleaned by service personnel, and be accessed to show potential residents. At the same time, when a former resident moves out of a rental unit, it might be necessary to rekey the door lock of the unit to protect it from unauthorized access by former residents, turn off lighting fixtures to mitigate electricity costs while the unit is vacant, adjust the thermostat settings of the unit to mitigate heating and/or cooling costs while the unit is vacant, and to monitor for certain conditions such as air quality, water leaks, etc. Presently, these types of management tasks (among others) require maintenance and/or service personnel to travel to rental units after being vacated by former tenants.

Home and building automation systems and devices provide the means to remotely control and automate lighting, door lock, appliance, security system, heating, ventilation, air conditioning (HVAC), window covering, and other automation devices, as well as air temperature, air quality, water, and other sensor devices. In that context, automation systems can include a number of automated, locks, switches, sensors, and other devices connected to a central automation hub or gateway through which the system is controlled. Many different user interfaces can be used to control such home or building automation systems, such as wall mounted terminals, web-based interfaces, and mobile phone applications, for example.

In the context of the tenant or resident management software platforms and automation systems described above, various aspects and embodiments of automations in tenancy transitions are described herein. In one example, an automation or gateway hub computing device receives and stores automation settings from an automation management service environment over time. The automation settings can include different automation settings for various states of occupancy of a rental unit or dwelling. The automation settings can include a first set of tenant-defined automation settings that can be defined and controlled by a tenant while the dwelling is occupied by the tenant. The automation settings can also include a secondary set of automation settings, such as vacancy automation settings for use during a period of vacancy of the dwelling. The second set of automation settings can be predefined by a property manager, for example, to help with transitioning the dwelling over to tenancy by one or more new tenants. Beyond transitions in tenancy, the second set of automation settings can also be relied upon to change or update automation settings in various automation devices at other suitable times and for other suitable reasons.

The automation or gateway hub can determine whether an automation transition event has occurred and, in response to the transition event, load the secondary automation settings into one or more home automation devices of the dwelling. As one example of a transition event, the automation or gateway hub can determine whether a transition in tenancy has occurred at the dwelling (e.g., determine whether the tenant has moved out) based on a vacancy (or tenancy) schedule provided by the automation management service environment, in response to an interruption in network communications with the automation management service environment, or based on a confluence of those or other conditions. In response to the transition in tenancy, the automation hub can load the vacancy automation settings into one or more home automation devices of the dwelling. As other examples of transition events, the automation hub can load the secondary automation settings into one or more home automation devices in response to predetermined events, such as the loss of power, the loss of network communications, or other events, predetermined schedules, and/or triggers defined by the secondary automation settings or other data.

When the automation hub loads the pre-stored vacancy automation settings into the home automation devices, the dwelling can be prepared for occupancy by another tenant. For example, when loaded, the vacancy automation settings can update a door lock of the dwelling to operate according to one or more new access credentials or access codes (e.g., PIN number, card access, fingerprint or other biometric marker, radio-frequency identification (RFID), or other hardware- or software-based credential) for access by authorized maintenance and/or service personnel. The vacancy automation settings can also update the door lock to operate with a predetermined (or preferred) access credential of the next tenant for the dwelling. Additionally, updating the home automation devices with the vacancy automation settings can also control lighting fixtures and/or electrical outlets to turn off (and/or on at any schedule) lighting fixtures, fans, appliances, etc., adjust the thermostat settings to predetermined temperatures over a predetermined schedule, and perform other automated events while the dwelling is vacant. These and other aspects of the embodiments are described in further detail below.

The concept of pre-storing additional or alternative automation settings in automation hubs, as described herein, is not limited to facilitating transitions between tenants. Instead, the concepts described herein can be relied upon to change or update the automation settings for any number of automation devices at any suitable time and for any suitable reason. For example, a transition in tenancy can result in the loss of network communications for an automation hub (e.g., due to service cancellation), which may indicate a need to change or update automation settings in various automation devices. However, there are other situations in which an automation hub might experience a loss in network communications, such as due to power loss, service disruption, or other problems, and it can be beneficial to change or update automation settings in those cases as well. It can also be beneficial to change or update automation settings in various automation devices even without any loss in network communications, such as to permit scheduled maintenance, to permit entry of realtors, for emergencies, etc.

Turning to the drawings, the following paragraphs introduce a networked environment for automations in tenancy transitions, followed by a description of the operation of the same. FIG. 1 illustrates an example networked environment 10 for automatic transitions in automation settings according to various examples described herein. Among other elements, the networked environment 10 includes a computing environment 20 which operates as an automation management service environment (also "automation environment 20"), a computing device 30 which operates as an automation hub or gateway (also "automation hub 30"), a network 40, various dwellings 50-53, various home automation devices 60-63 in the dwelling 50, and a client device 70.

The networked environment 10 is provided as an example for discussion. In other implementations, the tenancy transition concepts described herein can be applied to similar but different physical and logical arrangements of computing devices and computer networks. For example, the networked environment 10 can include additional (or fewer) computing environments (e.g., network or cloud-based servers, etc.), computing devices (e.g., automated hub or gateway devices, client computing devices, etc.), home automation devices, and other components. Further, certain components can be omitted in some embodiments.

Although the dwellings 50-53 are illustrated as separate homes in FIG. 1, the concepts described herein can be extended or applied to any number of rooms, cooperative units, condo units, apartment units, townhomes, single family homes, student housing units, military housing units, corporate housing units, office spaces, other work and dwelling spaces, and combinations thereof. Although not shown in FIG. 1, the concepts can also be extended for use with automation devices installed on exterior doors, perimeter fences, parking gates, and other shared gateways of buildings and communities.

The automation environment 20 can operate as an automation management service environment. The automation environment 20 can be embodied as one or more computers arranged in server banks and can be located at a single installation site or distributed among different geographical locations. The computers can include an arrangement of computing devices that together embody a hosted computing resource, a grid computing resource, or other distributed computing arrangement. In some cases, they can be embodied as an elastic computing resource where an allotted capacity of processing, network, storage, or other computing-related resources varies over time. As described in further detail below, they can also be embodied, in part, as certain functional or logical elements, such as executable computer-readable instructions (e.g., software), firmware, or other functional or logical components, that direct the automation environment 20 to perform the functions described herein.

A shown in FIG. 1, the automation environment 20 includes an interface engine 21, a management engine 22, and a transition coordinator 23. The interface engine 21, management engine 22, and transition coordinator 23 are representative of functional or logical elements, such as executable computer-readable instructions (e.g., software), firmware, or other functional or logical components, that direct the automation environment 20 to perform the functions described herein. Among other components, the automation environment 20 also includes a memory or data store. As shown in FIG. 1, the memory includes a hub and device database 24, automation data 25, and a settings queue 26.

The interface engine 21 can permit (and deny) user access to control the operation of the management engine 22. In general, two types of users are permitted access to control the operation of the management engine 22, property managers and tenants. In some cases, however, other individuals can control the operation of the management engine 22 through the interface engine 21, such as maintenance personnel, service personnel, realtors, and other users.

In one embodiment, the interface engine 21 is configured to generate, administer, and/or adapt one or more user interfaces or interface elements for control of the operation of the management engine 22. For example, the interface engine 21 can generate various network pages for display on a web browser or application executing on the client device 70. A user of the client device 70 (among other client devices) can monitor and control the operations of the management engine 22 using the user interfaces or interface elements generated and adapted over time by the interface engine 21. As described herein, the interface engine 21 can generate network pages that either enable or disable (e.g., permit or deny access to) certain features or functions of the automation devices 60-63, among others.

In another embodiment, rather than generating network pages for display on a web browser, the interface engine 21 is configured to direct or control certain operations of one or more stand-alone user interface applications (e.g., "apps") executing on the client device 70. In that sense, the interface engine 21 can adapt the stand-alone user interfaces to enable or disable (or permit or deny access to) certain features or functions of the automation device 60-63, among others. In any case, the interface engine 21 is configured to generate different (e.g., tailored) interfaces for administrators, maintenance, and staff personnel, and generate different interfaces for residents, guests, and other individuals. The differences between those interfaces can be determined, in part, based on the evaluation performed by the transition coordinator 23.

The interface engine 21 is not limited to control based on graphical user interfaces presented on the client device 70, however. The interface engine 21 can also be configured to work with a voice service programming interface. For example, certain operations of the management engine 22 can be directed through voice commands provided to the client device 70 (or another standalone client device), interpreted and processed by a third-party voice service connected to the network 40, and directed to the interface engine 21 as a command for the management engine 22.

The management engine 22 is configured to control and define the settings of and monitor the status or operation of the home automation devices 60-63 in the dwelling 50 in a managed, coordinated manner. Similarly, the management engine 22 is configured to control the settings and monitor the status of home automation devices in the dwellings 51-53 (among others) in a managed, coordinated manner. Although four dwellings 50-53 are shown in FIG. 1, the management engine 22 can control or manage the operation of automation devices at tens, hundreds, thousands, tens of thousands, or more units.

The hub and device database 24 includes data related to the automation hubs installed at the dwellings 50-53, including the automation hub 30 installed at the dwelling 50, among others. The hub and device database 24 can include information regarding the geographic locations, postal addresses, square footages, equipment and appliances, facilities, residents, rental histories, owners, automation devices, automation hubs, and other information about the dwellings 50-53. Further, the hub and device database 24 can include data that associates individual automation hubs with individual dwellings 50-53. For example, in the hub and device database 24, the automation hub 30 can be identified by a unique hardware identifier and associated with the geographic location or postal address of the dwelling 50 in a table or similar data structure.

The hub and device database 24 can also categorize or organize the dwellings 50-53 (among others) into one or more logical groups of units. By logically organizing dwellings into groups, the management engine 22 can uniformly apply automation settings to a group of dwellings without the need for a user to apply those settings to the dwellings in the group individually. For instance, if the dwellings 50-53 were logically organized to be managed together, a user of the automation environment 20 could define and apply the same temperature settings and schedules for the thermostats in all of the dwellings 50-53 in one (or a limited number of) operations through the interface engine 21.

The automation data 25 can include various classes or categories of automation settings for the home automation devices in the dwellings 50-53. The classes or categories of automation settings can be logically organized for different states of occupancy (e.g., occupied or long-term leased or rented, temporarily occupied or short-term leased or rented, unoccupied or vacant, in tenancy transition, under maintenance, open for viewing, etc.) of the dwellings 50-53. As two examples, the automation settings can include tenant-defined automation settings for the dwelling 50, which can be defined by a tenant that occupies the dwelling 50, and vacancy automation settings for use after the tenant vacates the dwelling 50. As one example case, certain automation settings (or classes or categories of automation settings) can only be defined and/or modified by property managers, for example, while other automation settings can only be defined and/or modified by tenants. In other cases, the ability of property managers and/or tenants to view, define, and/or modify automation settings for certain dwellings can depend upon which party has the right to occupy the dwellings and over what period(s) of time that those rights extend. The ability of property managers and/or tenants to view, define, and/or modify automation settings can also follow other suitable rules or conventions.

The automation data 25 can also specify certain attributes related to the automation devices 60-63, among others in the networked environment 10. The attributes can specify the make, model, and version numbers of the automation devices 60-63, the physical locations where the automation devices 60-63 are installed, a role or permission level required to access the automation devices 60-63, certain time or date ranges in which access to the automation devices 60-63 is permitted or denied, and other attributes.

The attributes in the automation data 25 can also be used to logically organize the automation devices 60-63 into certain categories of devices. For example, the attributes stored in the automation data 25 can specify whether each of the automation devices 60-63, among others, is installed in a shared or common area in a condo building, to be distinguished from service and maintenance areas in the building. Those categories can also be distinguished from individual units in the condo building. The attributes can also be used to logically organize access permissions by certain individuals (or categories of individuals) based on the access control rules 27 and/or the roles and permissions 28.

The transition coordinator 23, which can be embodied as a component or module of the management engine 22, is configured to coordinate updates to the automation settings at the dwellings 50-53. Those settings can be queued up in the settings queue 26 for communication over the network 40 to the automation hub 30 of the dwelling 50 (and automation hubs of the dwellings 51-53), for example, whenever possible and practicable. After being received from the automation environment 20, the automation hub 30 stores the automation settings for the home automation devices 60-63 (among others) at the dwelling 50. The transition coordinator 23 is configured to communicate new and updated automation settings to the automation hub 30, over time, as they are managed by the management engine 22.

Among other automation settings, the transition coordinator 23 can update both tenant-defined automation settings and vacancy automation settings on the automation hub 30. For example, during the occupancy of the dwelling 50 by a tenant, the management engine 22 can update the tenant-defined automation settings at the automation hub 30 based on changes made to those settings when the tenant uses the client device 170 to administer them through the interface engine 21. At the same time, the transition coordinator 23 can update the vacancy automation settings at the automation hub 30 based on changes to those settings made by the property manager of the dwelling 50. Thus, the automation hub 30 can simultaneously store both the tenant-defined automation settings and the vacancy automation settings, each of which can be defined by different parties for use during different phases of tenancy as described herein. Further, as described below, the automation hub 30 can load different home automation settings into the home automation devices 60-63 based on certain triggering events, such as when a tenant moves into the dwelling 50, moves out of the dwelling 50, or at other appropriate timings.

In some cases (or for some home automation devices), the automation settings stored in the automation hub 30 are not necessarily loaded into the home automation devices 60-63 for reference or processing at some later time. In other words, some home automation devices 60-63 do not operate autonomously based on automation settings. Instead, certain home automation devices 60-63 must be (or should be) directly commanded over time by the automation hub 30 based on the automation settings stored in the automation hub 30. For example, a light blub may offer automation features but be unable to turn itself on and off based on a predefined schedule stored in its own local memory. However, the automation hub 30 can command the automated light bulb to turn itself on and off based on a predefined schedule defined in memory on the automation hub 30. Thus, the automation hub 30 can evaluate various schedules and triggers and send commands to certain home automation devices 60-63 in response to those schedules and triggers.

The automation hub 30 can be embodied as a general- or specific-purpose embedded computing device, including one or more general- or specific-purpose processors, state machines, programmable logic devices, and one or more memory devices configured to perform the functions described herein. The automation hub 30 can be embodied as a system-on-chip (SOC) processor, for example, and can be mounted on a printed circuit board for integration or use with a memory, one or more wired or wireless physical layer communications devices, one or more display devices, and other components and subsystems. As more particular examples, the automation hub 30 can be embodied as one or more of the single-board computers described at https://en.wikipedia.org/wiki/Comparison of single-board computers, equivalents thereof. As another example, the automation hub 30 can be embodied as a network router, access point, or similar devices.

As shown in FIG. 1, the automation hub 30 includes an automation engine 31, a transition monitor 32, and one or more communications interfaces 33. The automation hub 30 also includes a memory or data store. The memory includes automation settings 34, activity history 35, and a management queue 36. The automation engine 31 is configured to set the operating parameters of and monitor the operating status of the home automation devices 60-63. The operating parameters of the home automation devices 60-63 can be set based on the automation settings 34. To set the operating parameters of the home automation devices 60-63, the automation engine 31 can communicate with the home automation devices 60-63 using the communications interfaces 33 according to wired or wireless communications standards and/or protocols, such as X10®, ZigBee®, Z-Wave®, IEEE 802.15.4, IEEE 1901, or IEEE 802.11, among others.

The communications interfaces 33 of the automation hub 30 can include one or more physical layer communication devices for data communications with the automation environment 20 over the network 40 and one or more other physical layer communication devices for data communications with the home automation devices 60-63 over the channels 38, which can include a combination of wired and wireless channels. The physical layer communication devices for data communications over the network 40 can include wired, wireless, or a combination of wired and wireless interfaces, including cellular interfaces. Similarly, the physical layer communication devices for data communications over the channels 38 can include wired, wireless, or a combination of wired and wireless interfaces, including cellular interfaces.

As representative examples, the automation devices 60-63 shown in FIG. 1 can be associated with door locks, light fixtures, appliances, thermostats, blinds, video cameras, sensors, security system devices, and other automation devices. The dwelling 50 can include other automation devices, such as air temperature, air quality, water, smoke, and other sensors. To communicate with the automation hub 30, each of the automation devices 60-63 can include a network communications stack having a combination of application, transport, and physical network access layers, such as X10®, ZigBee®, Z-Wave®, IEEE 802.15.4, IEEE 1901, or IEEE 802.11 layers, among others.

In part, the operations of each of the automation devices 60-63 can be controlled or directed by certain parameters and settings resident in memory. For example, the automation device 60 can be programmed by the automation hub 30 to unlock a door when one or more PIN codes are entered by an individual using a keypad or when key data is received by near-field communications with the client device 70. Similarly, the automation device 61 can be programmed by the automation hub 30 to set a target HVAC temperature for the dwelling 50. Those automation features and settings of the automation devices 60-63, among others, can be managed, in part, by the automation environment 20 (and stored as the automation data 25). Those same automation settings can be communicated to the automation hub 30 (and stored as the automation settings 34) by the automation environment 20. Finally, they can be communicated to the automation devices 60-63 by the automation hub 30.

The automation devices 60-63 can also communicate various types of status and control data back to the automation hub 30, and that data can be stored as activity history 35. The status and control data can include various data gathered by sensors of the automation devices 60-63. For example, the data can indicate when doors are opened at the dwelling 50, the temperature in the dwelling 50, the on/off status of outlets, fixtures, and appliances at the dwelling 50, power usage at the dwelling 50, and other status information related to the automation devices 60-63. That status and control data can be stored as the activity history 35 and, in some cases, communicated by the automation hub 30 to the automation environment 20 for reference and processing by the management engine 22.

The transition monitor 32 of the automation hub 30 is configured to determine whether a transition in tenancy has occurred at the dwelling 50 and, in response to the transition, trigger or direct the automation engine 31 to load the appropriate (e.g., different, new, updated, etc.) automation settings 34 into the home automation devices 60-63 of the dwelling 50. Additionally or alternatively, the automation hub 30 can directly command one or more of the home automation devices 60-63 based on the automation settings 34. The automation hub 30 can identify when a transition has occurred (or is about to occur) based on a schedule provided by the automation environment 20, in response to an interruption in network communications through the internet service provider (ISP) 41, using occupancy sensors, according to a command from the automation environment 20, based on a confluence of those factors or conditions, and/or other considerations.

When the transition monitor 32 detects that the dwelling 50 is vacant, it triggers the automation engine 31 to load new vacancy automation settings (which can be pre-stored in the automation settings 34) into one or more of the home automation devices 60-63 or to send commands to them at appropriate timings. In that way, the dwelling can be prepared for occupancy by another tenant. For example, the vacancy automation settings can update the automation device 60 of the dwelling 50 to operate according to one or more new access credentials or codes for access by authorized maintenance and/or service personnel. The vacancy automation settings can also update the automation device 60 to operate with the preferred (or predetermined) access credential of the next tenant for the dwelling 50. Additionally, the vacancy automation settings can control the automation devices 61 and 62 to turn off (and/or on at any schedule), adjust the thermostat settings of the automation device 63, and perform other automated events while the dwelling 50 is vacant. Additional operating aspects of the transition monitor 32 are described below with reference to FIG. 2.

In another aspect of the embodiments, the automation engine 31 is also configured to broadcast an ad-hoc network access identifier (e.g., WiFi SSID) when the transition monitor 32 detects a transition to vacancy of the dwelling 50, when identifying an interruption in network communications over the network 40, or at other suitable times. Based on that ad-hoc network access broadcast, devices, such as the client device 70, can identify and directly peer with the automation hub 30. Thus, if the transition monitor 32 detects an interruption in network communications over the network 40, the automation hub 30 can seek other ways to establish or maintain connectivity.

If the correct credentials (e.g., network password, etc.) are provided to the automation hub 30 by the client device 70, the automation engine 31 can authenticate the client device 70 for ad-hoc network communications. The access credentials can be predetermined by the automation environment 30 and stored on the automation hub 30 ahead of time, in anticipation that communications between the automation hub 30 and the automation environment 20 over the network 40 might be interrupted. The communications over the network 40 might be interrupted, for example, if the ISP 41 discontinues service to the dwelling 50 when the previous tenant terminates or disconnects it. Because they are predetermined, the access credentials can be known (or requested) by the user of the client device 70.

Once peered, the client device 70 can control certain functions through the automation hub 30. For example, the client device 70 can view and modify the automation settings 34, review the activity history 35, and control the home automation devices 60-63, for example. Any changes to the automation settings 34 can be stored in the management queue 36. When it establishes an ad-hoc communications session with the automation hub 30, the client device 70 can create a tethered network channel (e.g., WiFi to cellular) back to the automation environment 20. Thus, if communications between the automation hub 30 and the automation environment 20 are interrupted over the network 40 because the ISP 41 has discontinued service, those communications can be routed through the ad-hoc communications session with client device 70.

The network 40 can include the Internet, intranets, extranets, wide area networks (WANs), local area networks (LANs), wired networks, wireless networks, cellular networks, cable networks, satellite networks, other suitable networks, or any combinations thereof. Although not shown in FIG. 1, the networked environment 10 can also include communicative connections to any number and type of network hosts or devices, such as website servers, file servers, cloud computing resources, databases, data stores, or any other network or computing architectures. The ISP 41 can include any provider of internet or data communications services, such as a "last-mile" internet service provider.

The devices in the networked environment 10 can communicate with each other using various application layer, transport layer, and internet layer protocols and systems interconnect frameworks. For example, the computing devices can communicate with each other using hypertext transfer protocol (HTTP), file transfer protocol (FTP), internet message access protocol (IMAP), real-time transport protocol (RTP), simple object access protocol (SOAP), representational state transfer (REST), real-time transport protocol (RTP), real time streaming protocol (RTSP), real time messaging protocol (RTMP), transmission control protocol (TCP), user datagram protocol (UDP), internet protocol (IP), other protocols and interconnect frameworks, and combinations thereof.

The client device 70 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. The client device 70 can include various peripheral devices or components. The peripheral devices can include input or communications devices or modules, such as keyboards, keypads, touch pads, touch screens, microphones, cameras, wireless communications modules (e.g., infra-red, WiFi, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 70.

The client device 70 can execute various applications. The applications can include hypertext-based network browsers, such as the Internet Explorer®, Firefox®, Chrome®, Safari®, or Silk® browsers, among other types of browsers. Such a browser can be used to access the automation environment 20 and render a user interface presented by the interface engine 21. The client device 70 can also execute stand-alone user interface applications (e.g., "apps"), including an application dedicated to the administration of automation devices.

In a variation on the embodiments described above, one or more of the home automation devices 60-63 can include cellular-based communications components. Thus, the home automation devices 60-63 can communicate directly with the automation environment 20 in some cases. Under that logical communications structure, the functions of the automation hub 30 can be, at least in part, incorporated into the automation environment 20, and the automation environment 20 can load automation settings into and/or directly command the home automation devices 60-63. In some cases, the automation environment 20 and the automation hub 30 can work in concert together to command certain ones of the home automation devices 60-63 based on various factors including the communications capabilities of the home automation devices 60-63, WiFi- vs. cellular-based communications network costs, communications network latency, and other factors. The automation environment 20 and the automation hub 30 can offer redundancy to each other, offer additional communications and device command options to each other, and generally work together to implement the concepts described herein.

Figure 2:
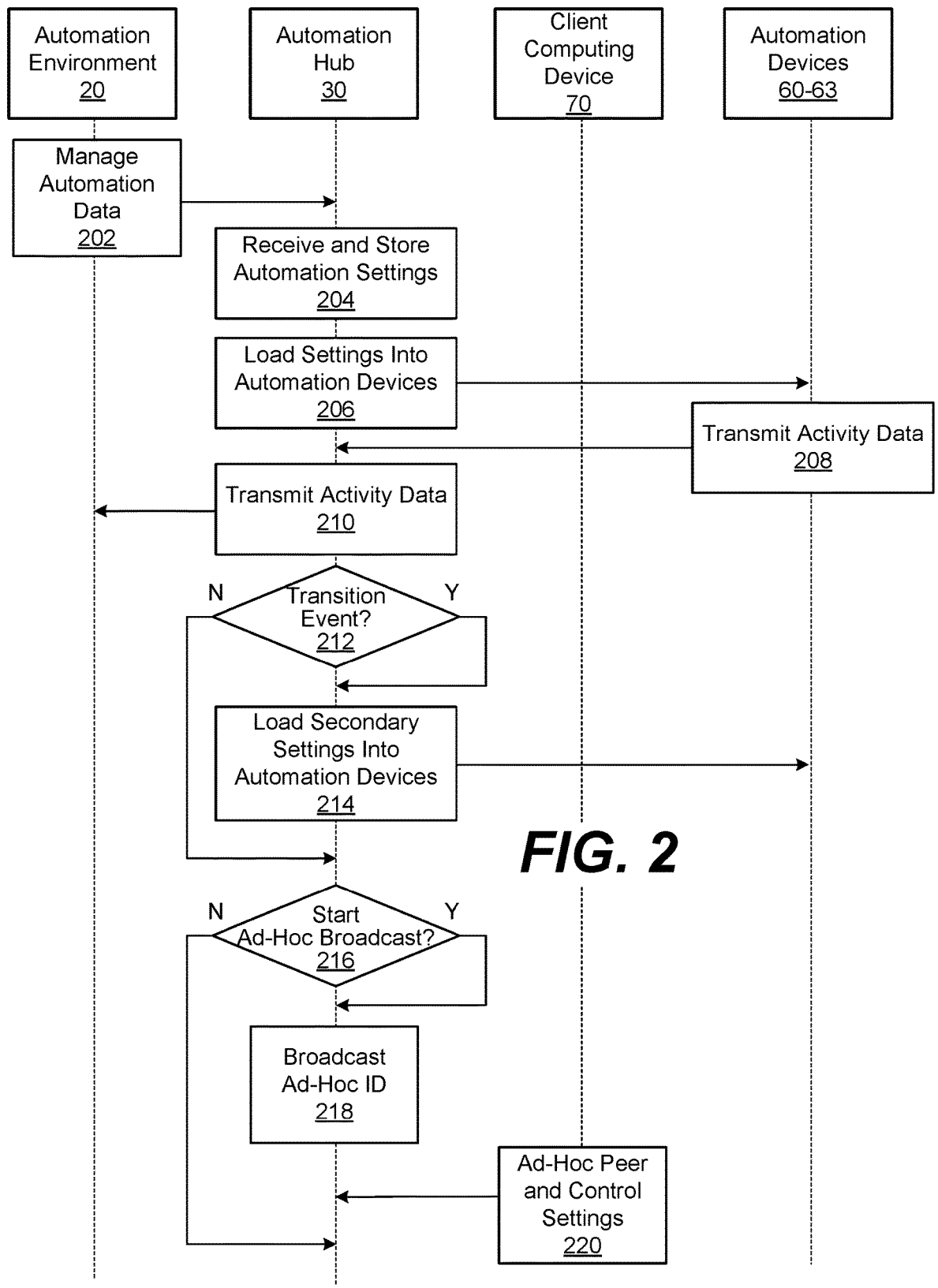
FIG. 2 illustrates a process for automatic transitions in automation settings according to various examples described herein.

FIG. 2 illustrates a process for automatic transitions in automation settings according to various examples described herein. Although the process is described below as being performed by the computing devices shown in the networked environment 10 of FIG. 1, the process can be performed by other, similarly configured computing devices. Further, although the flowchart in FIG. 2 shows a specific order of steps, the order of execution can differ from that shown. For example, the order of execution of two or more steps can be switched relative to the order shown. Also, two or more steps shown in succession can be executed concurrently or with partial concurrence. Further, one or more of the steps can be conducted again at various times, conducted over time, skipped, or omitted.

At step 202, the process includes the automation environment 20 managing automation data associated with the automation devices 60-63. For example, the management engine 22 can manage and control the automation data 25 shown in FIG. 1. In that context, the interface engine 21 can generate one or more user interface elements (e.g., network pages, forms, data fields, etc.) to facilitate the ability of various individuals (e.g., tenants, property managers, etc.) to interface with the management engine 22 for the purpose of managing and controlling the automation data 25. Additionally, at step 202, the process includes the automation environment 20 transmitting or communicating a portion of the automation data 25, as automation settings, to the automation hub 30 over the network 40. The automation settings can include tenant-defined automation settings, secondary automation settings, vacancy automation settings, and other types or categories of settings. The automation settings can also include a second set of vacancy automation settings for use during a period of vacancy of the dwelling. The vacancy automation settings can be predefined by a property manager, for example, to help with transitioning the dwelling over to tenancy by one or more new tenants.

At step 204, the process includes the automation hub 30 receiving the automation settings from the automation environment 20 and storing them, locally, as the automation settings 34.

At step 206, the process includes the automation hub 30 loading the automation settings 34 (or certain automation data and/or parameters of the automation settings 34) into one or more of the automation devices 60-63. As noted above, the operations of the automation devices 60-63 can be controlled or directed, in part, by certain parameters and settings resident in memory at the devices. For example, the automation device 60 can be pre-programmed by the automation hub 30 to unlock a door when one or more PIN codes are entered by an individual using a keypad. Thus, the automation hub 30 can control or impact certain operational and functional aspects of the automation devices 60-63 by loading the automation settings 34 (or certain automation data and/or parameters of the automation settings 34) into one or more of the automation devices 60-63. Additionally or alternatively, at step 206, the process can also include the automation hub 30 directly controlling or commanding features or functions of the automation devices 60-63 based on the automation settings 34 received at step 204.

At step 208, the process includes one or more of the automation devices 60-63 transmitting status, control, or other activity data back to the automation hub 30. That activity data can include data gathered by sensors of the home automation devices 60-63. For example, the data can indicate when doors are opened at the dwelling 50, the temperature in the dwelling 50, the on/off status of outlets, fixtures, and appliances at the dwelling 50, power usage at the dwelling 50, and other status information or activity data related to and collected by the home automation devices 60-63. In turn, at step 210, the process includes the automation hub 30 transmitting the status, control, or other activity data back to the automation environment 20 for reference and processing by the management engine 22. Thus, the automation hub 30 closes a control loop between the home automation devices 60-63 and the automation environment 20. Steps 202, 204, 206, 208, and 210 can occur in any sequence and/or order in an ongoing fashion over time.

At step 212, the process includes the automation hub 30 determining whether a transition event, such as a transition in tenancy has occurred at the dwelling 50. The automation hub 30 can determine when a transition event has occurred (or is about to occur) based on a schedule provided by the automation environment 20, in response to an interruption in network communications through the internet service provider (ISP) 41, using occupancy sensors, according to a command from the automation environment 20, based on a confluence of those factors or conditions, and/or other considerations. If a transition event is detected, the process proceeds to step 214. Otherwise, the process proceeds to step 216.

At step 214, in response to the detection of a transition event at step 212, the process includes the automation hub 30 loading the previously-stored secondary or vacancy automation settings from the automation settings 34 into one or more of the home automation devices 60-63. The particular secondary or vacancy automation settings among the settings stored in the automation settings 34, and which of the home automation devices 60-63 to load them into, can be predetermined at the automation hub 30 based on instructions from the automation environment 20, for example.

As a more particular example, if the automation hub 30 detects at step 212 that some type of tenancy transition has occurred at the dwelling 50 (among others), then it can load vacancy automation settings (which can be pre-stored in the automation settings 34) into one or more of the home automation devices 60-63. In that way, the dwelling 50 can be prepared for vacancy, occupancy by another tenant, and/or for another purposes. The vacancy automation settings can update the automation device 60 of the dwelling 50 to operate according to one or more new access credentials or codes for access by authorized maintenance and/or service personnel. The vacancy automation settings can also update the automation device 60 to operate with the predetermined (or preferred) access credentials of the next tenant for the dwelling 50. Additionally, the vacancy automation settings can control the automation device 61 and automation device 62 to turn off (and/or on at any schedule), adjust the thermostat settings of the automation device 63, and perform other automated events while the dwelling 50 is vacant.

At step 216, the process includes the automation hub 30 determining whether to start the broadcast of an ad-hoc network access identifier (e.g., WiFi SSID). The automation hub 30 can start that broadcast when identifying an interruption in network communications over the network 40, based on a command from the automation environment 20, or at other suitable times (or all the time). If starting the broadcast, the process proceeds to step 218 where an ad-hoc network access identifier is broadcast by the automation hub 30. In some cases, the process can include the use of cellular-based communications when identifying an interruption in service over the network 40. In that case, the cellular communications could be limited to only more critical or essential data, and other data communications could be halted or queued for when service over the network 40 is restored or an ad-hoc network communication channel is opened.

Based on the ad-hoc network access identifier broadcast at step 218, devices, such as the client device 70, can identify and directly peer with the automation hub 30 at step 220. Once peered, the client device 70 can control certain functions through the automation hub 30. For example, the client device 70 can view and modify the automation settings 34, review the activity history 35, and control the home automation devices 60-63, for example.

Figure 3:
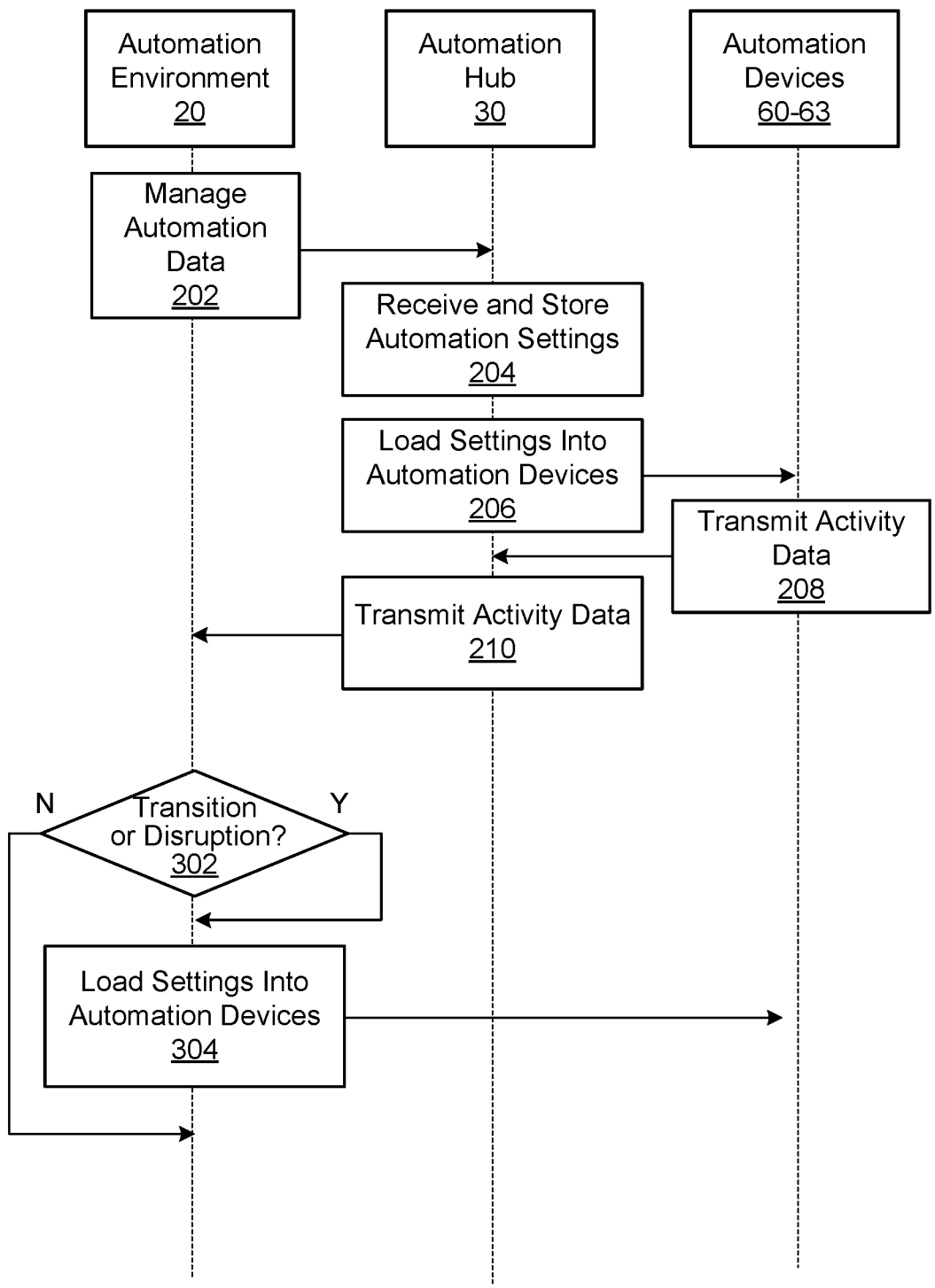
FIG. 3 illustrates another process for automatic transitions in automation settings according to various examples described herein.

Turning to other examples, FIG. 3 illustrates another process for automatic transitions in automation settings according to various examples described herein. In FIG. 3, steps 202, 204, and 206, 208, and 210 are the same as (or similar to) those shown in FIG. 2. At step 302, however, the process includes the automation environment 20 determining whether a transition event, such as a transition in tenancy, has occurred at the dwelling 50 (rather than automation hub 30 doing so). The automation hub 30 can determine whether a transition event has occurred (or is about to occur) based on a command from a manager or administrator, based on a predefined schedule entered by a manager or administrator, in response to an interruption in network communications with the automation hub 30 through the network 40, based on a confluence of those factors or conditions, and/or other considerations. If a transition or disruption is detected, the process proceeds to step 304. Otherwise, the process proceeds with other suitable steps (e.g., may return to step 202).

Step 302 can also include the automation environment 20 determining whether a disruption has occurred. Such a disruption can occur if or when network communications with the automation hub 30 have been lost, a hardware or software failure has occurred with the automation hub 20, or other conditions. Thus, if a problem or error condition is detected at step 302, the process can also proceed to step 304 on that basis.

At step 304, the process includes the automation environment 20 loading certain automation settings, such as the secondary or vacancy automation settings, from the automation data 24 into one or more of the home automation devices 60-63. As described above, one or more of the home automation devices 60-63 can include cellular-based communications components. Thus, the automation environment 20 can communicate directly with the home automation devices 60-63 in some cases. In that way, the dwelling 50 can be prepared for occupancy by another tenant, for example, or for another purpose. The secondary or vacancy automation settings can update the automation device 60 of the dwelling 50 to operate according to one or more new access credentials or codes for access by authorized maintenance and/or service personnel. The vacancy automation settings can also update the automation device 60 to operate with the predetermined (or preferred) access credentials of the next tenant for the dwelling 50. Additionally, the secondary or vacancy automation settings can control the automation device 61 and automation device 62 to turn off (and/or on at any schedule), adjust the thermostat settings of the automation device 63, and perform other automated events while the dwelling 50 is vacant.

Figure 4:
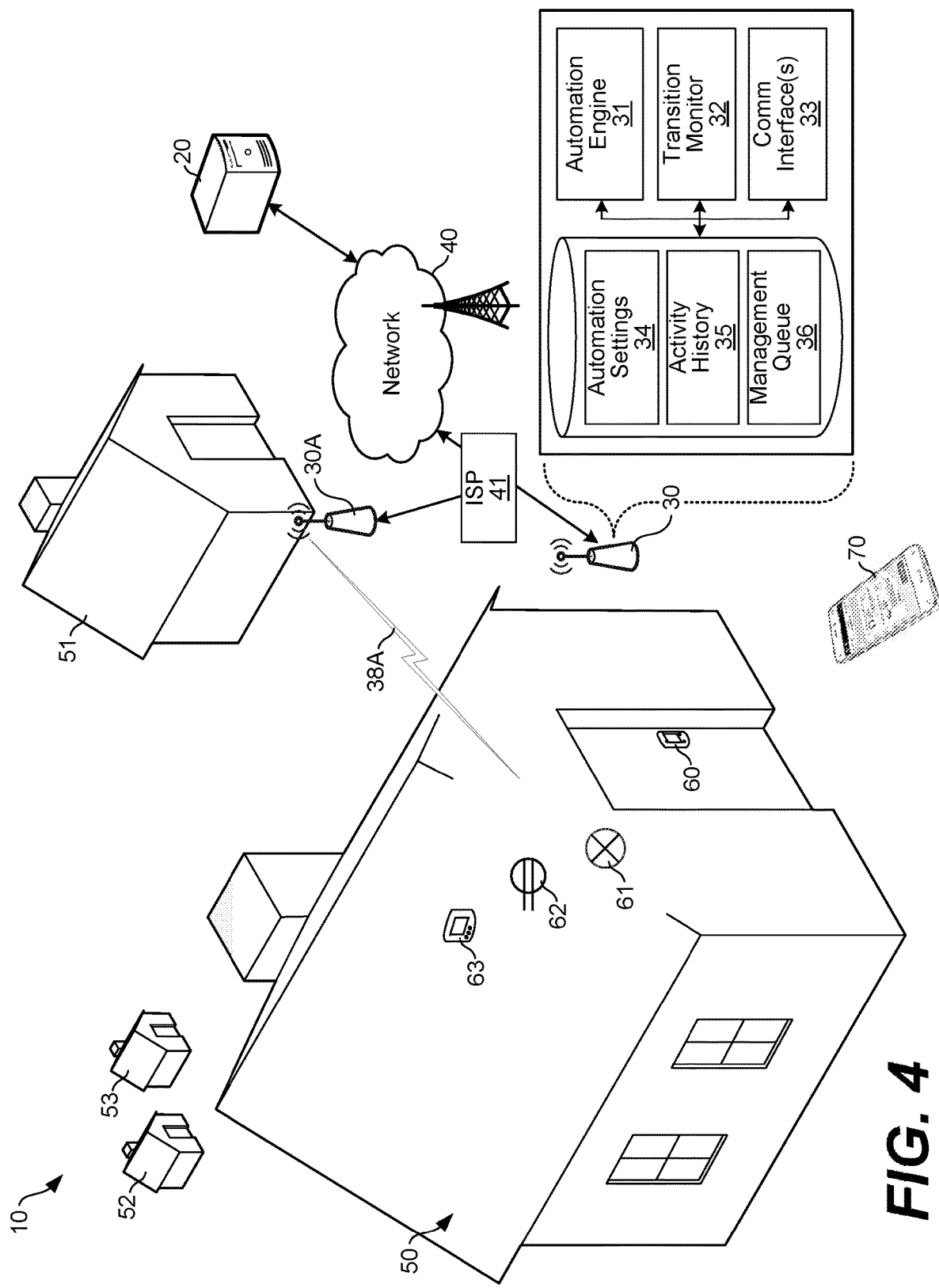
FIG. 4 illustrates another example of the networked environment shown in FIG. 1 according to various examples described herein.

FIG. 4 illustrates another example of the networked environment 10 shown in FIG. 1 according to various examples described herein. In FIG. 4, the automation hub 30A of the dwelling 51 is illustrated. As shown in FIG. 4, the dwelling 51 can be in relatively close geographic proximity to the dwelling 50 and the automation devices 60-63 in the dwelling 50. For example, the dwellings 50 and 51 can be next door neighbors on the same street or even side-by-side condo or apartment units in the same building. In that case, it can be possible for the automation hub 30A to directly control the automation settings of the automation devices 60-63 using the communications channel 38A. To do so, the automation environment 30 can program the automation hub 30A with certain automation settings from the automation hub 30. This can be helpful, for example, if network communications between the automation environment 20 and the automation hub 30 are disrupted (e.g., because of a tenancy transition or other situation), if a hardware or software failure has occurred with the automation hub 20, or other conditions.

Figure 5:
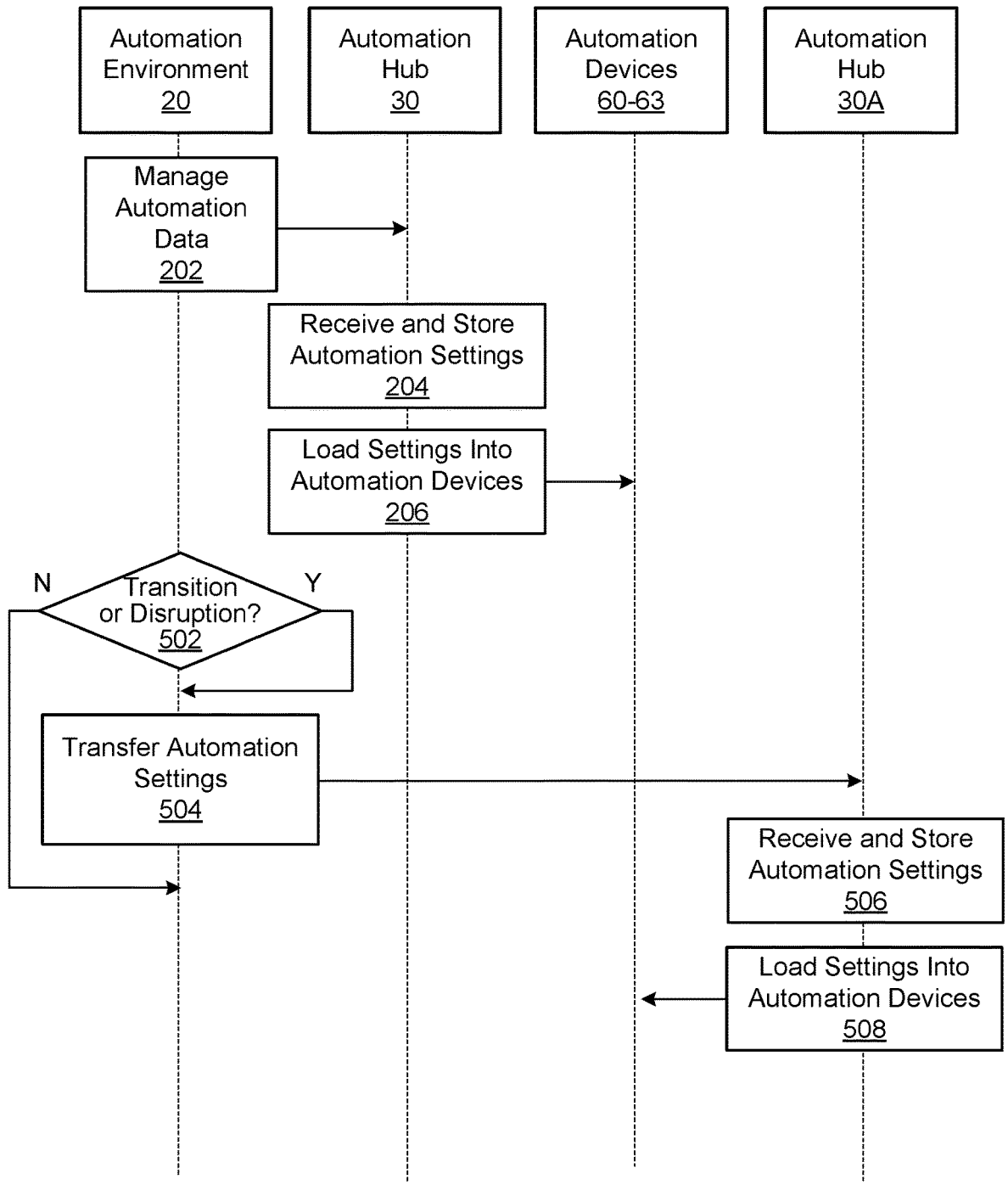
FIG. 5 illustrates another process for automatic transitions in automation settings according to various examples described herein.

FIG. 5 illustrates another process for automatic transitions in automation settings according to various examples described herein. In FIG. 5, steps 202, 204, and 206 are the same as (or similar to) those shown in FIG. 2. At step 502, however, the process includes the automation environment 20 determining whether a transition event, such as a transition in tenancy, has occurred at the dwelling 50 (rather than automation hub 30 doing so). The automation hub 30 can determine whether a transition event has occurred (or is about to occur) based on a command from a manager or administrator, based on a predefined schedule entered by a manager or administrator, in response to an interruption in network communications with the automation hub 30 through the network 40, based on a confluence of those factors or conditions, and/or other considerations. If a transition or disruption is detected, the process proceeds to step 304. Otherwise, the process proceeds with other suitable steps (e.g., may return to step 202).

Step 502 can also include the automation environment 20 determining whether a disruption has occurred. Such a disruption can occur if or when network communications with the automation hub 30 have been lost, a hardware or software failure has occurred with the automation hub 20, or other conditions. Thus, if a problem or error condition is detected at step 504, the process can also proceed to step 304 on that basis.

At step 504, the process includes the automation environment 20 transferring certain automation settings for the automation hub 30 to the automation hub 30A. To do so, the automation environment 20 can reference the hub and device database 24 to determine which dwelling, if any, is proximate to the dwelling 50. The automation environment 20 can review street addresses, map data, or other data to assist with that determination. For the example illustrated in FIG. 4, the dwelling 51 is proximate to the dwelling 50, and the automation environment 20 can identify the automation hub 30A as being associate with the dwelling 51. Then, the automation environment 20 can reference the automation data 24 to obtain a copy of the automation settings used for the automation hub 30, and transfer them to the automation hub 30A at step 504.

At step 506, the process includes the automation hub 30A receiving the automation settings from the automation environment 20 and storing them locally into memory. At step 508, the process includes the automation hub 30A loading the automation settings (or certain automation data and/or parameters of the automation settings) into one or more of the automation devices 60-63. As noted above, the operations of the automation devices 60-63 can be controlled or directed, in part, by certain parameters and settings resident in memory at the devices. In that way, the automation hub 30A can be used to control the automation devices 60-63 at the dwelling 50 in certain cases.

FIGS. 2, 3 and 5 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing devices described herein can include at least one processing circuit. The processing circuit can include, for example, one or more processors and one or more storage devices that are coupled to a local interface. The local interface can include, for example, a data bus with an accompanying address/control bus or any other suitable bus structure. The one or more storage devices can store data or components that are executable by the one or more processors of the processing circuit. For example, the interface engine 21, management engine 22, automation engine 31, transition monitor 32, and other components can be stored in one or more storage devices and be executable by one or more processors in the computing devices.

The interface engine 21, management engine 22, automation engine 31, transition monitor 32, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in a non-transitory computer-readable medium for use by or in connection with an instruction execution system such as one of the processors or processing circuits described herein. The computer-readable medium can contain, store, and/or maintain the software or program instructions for use by or in connection with the instruction execution system. A computer-readable medium can include a physical media, such as, magnetic, optical, semiconductor, and/or other suitable media. Examples of suitable computer-readable media include, but are not limited to, solid-state drives, magnetic drives, or flash memory.

Further, any logic or applications described herein, including the interface engine 21, management engine 22, automation engine 31, and transition monitor 32 can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All modifications and variations are intended to be included herein within the scope of this disclosure and protected by the following claims.

Therefore, the following is claimed:

1. A method for automating transitions for home automation, comprising:
   receiving, by an automation hub at a dwelling, first automation settings from an automation computing environment over a network during a first time period and storing the first automation settings in the automation hub at the dwelling;
   loading, by the automation hub, at least one automation setting among the first automation settings into a home automation device at the dwelling;
   receiving, by the automation hub, second automation settings from the automation computing environment over the network during a second time period and storing the second automation settings in the automation hub, the second automation settings comprising a schedule;
   determining, by the automation hub, that a transition has occurred for the dwelling based on the schedule;
   in response to determining the transition, loading, by the automation hub, at least one other automation setting among the second automation settings into the home automation device at the dwelling; and
   in response to determining the transition, broadcasting, by the automation hub, an ad-hoc network access identifier.

2. The method of claim 1, wherein the second automation settings comprise settings for a period of vacancy for the dwelling.

3. The method of claim 2, wherein the schedule identifies the period of vacancy for the dwelling.

4. The method of claim 1, wherein the second automation settings comprise at least one of a start date for a vacancy of the dwelling, an end date for the vacancy, an access credential for maintenance or service personnel during the vacancy, and an access credential for a resident of the dwelling after the vacancy.

5. The method of claim 1, wherein loading the at least one other automation setting into the home automation device comprises:
   removing, by the automation hub, a first access credential from an automated door lock device using a communications channel at the dwelling; and
   loading, by the automation hub, a second access credential into the automated door lock device using the communications channel at the dwelling.

6. The method of claim 1, wherein loading the at least one other automation setting into the home automation device comprises loading a thermostat setting into an automated thermostat device using a communications channel at the dwelling.

7. The method of claim 1, wherein determining that the transition has occurred comprises identifying an interruption in network communications over the network by the automation hub.

8. The method of claim 1, wherein broadcasting the ad-hoc network access identifier comprises broadcasting a service set identifier (SSID) by the automation hub.

9. The method of claim 8, further comprising:
   authenticating a peer device on the ad-hoc network using the SSID; and
   receiving third automation settings from the peer device.

10. A home automation hub, comprising:
   a memory device to store computer readable instructions thereon; and
   an automation hub computing device at a dwelling configured, through execution of the computer readable instructions, to:
      receive first automation settings from an automation computing environment over a network during a first time period and store the first automation settings in the memory device;
      load at least one automation setting among the first automation settings into a home automation device at the dwelling;
      receive second automation settings from the automation computing environment over the network during a second time period and store the first automation settings in the memory device, the second automation settings comprising a schedule;
      determine that a transition has occurred for the dwelling based on the schedule;
      in response to the transition, load at least one other automation setting among the second automation settings into the home automation device at the dwelling; and
      in response to the transition, broadcast an ad-hoc network access identifier.

11. The home automation hub of claim 10, wherein the second automation settings comprise settings for a period of vacancy for the dwelling.

12. The home automation hub of claim 10, wherein the schedule identifies a period of vacancy for the dwelling.

13. The home automation hub of claim 10, wherein the second automation settings comprise at least one of a start date for a vacancy of the dwelling, an end date for the vacancy, an access credential for maintenance or service personnel during the vacancy, and an access credential for a resident of the dwelling after the vacancy.

14. The home automation hub of claim 10, wherein, to load the at least one other automation setting into the home automation device, the automation hub computing device is configured to load an access credential into an automated door lock device using a communications channel at the dwelling.

15. The home automation hub of claim 10, wherein, to load the at least one other automation setting into the home automation device, the automation hub computing device is configured to load a thermostat setting into an automated thermostat using a communications channel device at the dwelling.

16. The home automation hub of claim 10, wherein the automation hub computing device is further configured, in response to the transition, to broadcast a service set identifier (SSID) as the ad-hoc network access identifier.

17. The home automation hub of claim 16, wherein the automation hub computing device is further configured to:
   authenticate a peer device on the ad-hoc network using the SSID; and
   receive automation settings from the peer device.

18. A method for automation, comprising:
   receiving, by an automation hub, first automation settings from an automation computing environment over a network during a first time period and storing the first automation settings in the automation hub;
   loading, by the automation hub, at least one automation setting among the first automation settings into a home automation device at a dwelling;
   receiving, by the automation hub, second automation settings from the automation computing environment over the network during a second time period and storing the second automation settings in the automation hub, the second automation settings comprising a schedule;
   determining, by the automation hub, that a transition has occurred for the dwelling based on the schedule; and
   in response to the transition, loading, by the automation hub, at least one other automation setting among the second automation settings into the home automation device at the dwelling and broadcasting an ad-hoc network access identifier.

19. The method of claim 18, wherein the schedule identifies a period of vacancy for the dwelling.

20. The method of claim 18, wherein the second automation settings comprise at least one of a start date for a vacancy of the dwelling, an end date for the vacancy, an access credential for maintenance or service personnel during the vacancy, and an access credential for a resident of the dwelling after the vacancy.

* * * * *